(12) United States Patent
Huebner-Keese et al.

(10) Patent No.: US 9,591,870 B2
(45) Date of Patent: *Mar. 14, 2017

(54) FOOD COMPOSITION COMPRISING A CELLULOSE ETHER

(75) Inventors: Britta Huebner-Keese, Uetze (DE); Carol E. Mohler, Midland, MI (US); Meinolf Brackhagen, Walsrode (DE); Roland Adden, Walsrode (DE); Robert L. Sammler, Midland, MI (US); Jonathan D. Moore, Midland, MI (US); Matthias Knarr, Nienburg/Weser (DE)

(73) Assignee: Dow Global Technologies LLC

( * ) Notice: Subject to any disclaimer, the term of this patent is extended or adjusted under 35 U.S.C. 154(b) by 142 days.

This patent is subject to a terminal disclaimer.

(21) Appl. No.: 14/125,405

(22) PCT Filed: Jun. 6, 2012

(86) PCT No.: PCT/US2012/041008
§ 371 (c)(1),
(2), (4) Date: Dec. 11, 2013

(87) PCT Pub. No.: WO2012/173838
PCT Pub. Date: Dec. 20, 2012

(65) Prior Publication Data
US 2014/0134317 A1 May 15, 2014

Related U.S. Application Data

(60) Provisional application No. 61/496,787, filed on Jun. 14, 2011.

(51) Int. Cl.
| | | |
|---|---|---|
| *A23L 1/0522* | (2006.01) | |
| *C08B 11/20* | (2006.01) | |
| *C08L 1/28* | (2006.01) | |
| *C08B 11/193* | (2006.01) | |

(52) U.S. Cl.
CPC ........... *A23L 1/05223* (2013.01); *A23L 11/07* (2016.08); *A23L 29/219* (2016.08); *A23L 29/262* (2016.08); *C08B 11/193* (2013.01); *C08B 11/20* (2013.01); *C08L 1/28* (2013.01)

(58) Field of Classification Search
CPC .............................. A61K 47/38; A61K 9/2054
See application file for complete search history.

(56) References Cited

U.S. PATENT DOCUMENTS

| | | | |
|---|---|---|---|
| 4,458,068 A * | 7/1984 | Warner ................. C08B 11/193 | 524/733 |
| 4,900,573 A * | 2/1990 | Meyers et al. ................ 426/302 | |
| 6,482,940 B1 | 11/2002 | Klohr et al. | |
| 9,051,218 B2 * | 6/2015 | Kiesewetter .......... C04B 24/383 | |
| 9,364,546 B2 * | 6/2016 | Grasman ............... C08B 11/193 | |
| 2001/0025101 A1 | 9/2001 | Schlesiger et al. | |
| 2003/0044511 A1 | 3/2003 | Zerbe et al. | |
| 2005/0255206 A1 | 11/2005 | Fukasawa et al. | |
| 2010/0291272 A1 | 11/2010 | Steffens et al. | |
| 2013/0193370 A1 * | 8/2013 | Adden .................. C04B 35/185 | 252/73 |
| 2013/0236512 A1 * | 9/2013 | Adden .................. C08B 11/193 | 424/400 |
| 2015/0057356 A1 * | 2/2015 | Grasman ............... C08B 11/193 | 514/570 |
| 2015/0057358 A1 * | 2/2015 | Brackhagen ......... A61K 9/2054 | 514/629 |
| 2015/0065548 A1 * | 3/2015 | Adden ..................... A61K 9/08 | 514/391 |

FOREIGN PATENT DOCUMENTS

| | | |
|---|---|---|
| EP | 967891 B1 | 1/2000 |
| EP | 1171471 | 12/2003 |
| EP | 2253216 A2 | 11/2010 |
| GB | 2444020 | 5/2008 |
| WO | 2012051035 | 4/2012 |

OTHER PUBLICATIONS

Handbook of Nutrition and Food, 3rd Edition, edited by Carolyn D. Berdanier, Johanna T. Dwyer and David Heber, CRC Press, 2014, p. 421.*
WO 2012/051035 A1, Adden et al. Apr. 19, 2012.*
Carbohydrate Polymers. 22, 1993, p. 175-186. Hague et al: Thermogelation of methylcellulose. Part II: effect of hydroxypropyl substituents.
Carbohydrate Polymers, 22, 1993, p. 161-173. Hague et al: Thermogelation of methylcellulose. Part I: molecular structures and processes.
Z. Anal. Chem. 286, 1977, p. 161-190, Ketterer: Analysis of Cellulose Ether Groups.
Carbohydrate Research, 176, 1988, 137-144. Lindberg: Distribution of Substituents in O-Ethyl-O (2-Hydroxyethyl) Cellulose.
Journal of Gas Chromatography, vol. 2, 1964, 173-199. Ackman: Fundamental Groups in the Response of Flame Ionization Detectors to Oxygenated Aliphatic Hydrocarbons.
Carbohydrate Research, 40. 1975, 217-225, Sweet: Quantitative Analysis by Various G.L.C. Response-Factor Theories for Partially Methylated and Partially Ethylated Alditol Acetates.
Journal of Gas Chromatography, vol. 6, 1968, 138-138. Addison: Flame Ionization Detector Molar Responses for Methyl Esters of Some Polyfunctional Metabolic Acids.

* cited by examiner

*Primary Examiner* — Jill Warden
*Assistant Examiner* — Hong T Yoo

(57) ABSTRACT

Cellulose ethers are described herein which are useful in food compositions. In these cellulose ethers the ether substituents are methyl groups, hydroxyalkyl groups, and optionally alkyl groups being different from methyl, the cellulose ether has a DS(methyl) of from 1.65 to 2.20, an MS(hydroxyalkyl) of from 0.10 to 1.00, and hydroxy groups of anhydroglucose units are substituted with methyl groups such that [$s23/s26-0.2*MS(hydroxyalkyl)$] is 0.35 or less, wherein $s23$ is the molar fraction of anhydroglucose units wherein only the two hydroxy groups in the 2- and 3-positions of the anhydroglucose unit are substituted with methyl groups and wherein $s26$ is the molar fraction of anhydroglucose units wherein only the two hydroxy groups in the 2- and 6-positions of the anhydroglucose unit are substituted with methyl groups.

17 Claims, No Drawings

FOOD COMPOSITION COMPRISING A CELLULOSE ETHER

FIELD

This invention relates to a food composition comprising a cellulose ether.

BACKGROUND

It has been known for a long time to incorporate cellulose ethers into food compositions, particularly into processed food compositions, to improve various properties, such as freeze thaw stability and/or texture or to improve firmness during manufacturing, machine handling or frying. UK Patent Application GB 2 444 020 discloses such food compositions comprising a non-ionic cellulose ether, such as methyl cellulose, hydroxypropyl cellulose, or hydroxypropyl methylcellulose. Methylcellulose and hydroxypropyl methylcellulose have "thermoreversible gelation properties". Described specifically, when an aqueous solution of methylcellulose or hydroxypropyl methylcellulose is heated, de-hydration of the hydrophobic methoxyl groups localized in the molecule occurs and it turns into a hydrous gel. When the resulting gel is cooled, on the other hand, the hydrophobic methoxyl groups are re-hydrated, whereby the gel returns to the original aqueous solution.

European Patent EP 1 171 471 discloses methylcellulose which is very useful in solid food compositions, such as solid vegetable, meat, and soy patties, due to its enhanced gel strength. The methylcellulose provides improved hardness and cohesion to the solid food compositions, thus providing excellent bite feel to consumers eating the processed food composition. The methylcellulose reaches its full capacity in providing good hardness and cohesion to solid food compositions when it is dissolved in cooled water, e.g. of 5° C. or less, before or after it is blended with other components of the food composition.

However, in some cases the use of cooled water is inconvenient to producers of food compositions. Accordingly, it would be desirable to provide cellulose ethers which provide good hardness and cohesion to solid food compositions even when the cellulose ethers are dissolved in water that has about room temperature.

Hydroxyalkyl methylcelluloses, such as hydroxypropyl methylcellulose, which are also useful in food compositions, are known to have a low storage modulus, compared to methyl cellulose. Hydroxyalkyl methylcelluloses which exhibit a low storage modulus do not form strong gels. High concentrations are needed to form even weak gels (Hague, A; Richardson, R. K.; Morris, E. R., Gidley, M. J and Caswell, D. C in Carbohydrate Polymers 22 (1993) p. 175; and Hague, A. and Morris, E. R. in Carbohydrate Polymers 22 (1993) p. 161).

When hydroxyalkyl methylcelluloses, such as hydroxypropyl methylcelluloses, which exhibit a low storage modulus are included in solid food compositions, their hardness and cohesion is not sufficiently high for some applications.

One object of the present invention is to provide hydroxyalkyl methylcelluloses, particularly hydroxypropyl methylcelluloses, that provide improved hardness and/or cohesion to solid food compositions, as compared to known comparable hydroxyalkyl methylcelluloses, such as hydroxypropyl methylcelluloses.

A preferred object of the present invention is to provide hydroxyalkyl methylcelluloses, particularly hydroxypropyl methylcelluloses that provide good hardness and/or cohesion to solid food compositions even when the hydroxyalkyl methylcelluloses are dissolved in water that has about room temperature.

SUMMARY

Surprisingly hydroxyalkyl methylcelluloses, particularly hydroxypropyl methylcelluloses, have been found which are useful for preparing solid food compositions which have a higher hardness and/or cohesion than solid food compositions comprising comparable known hydroxyalkyl methylcelluloses, particularly hydroxypropyl methylcelluloses.

Also surprisingly, some hydroxyalkyl methylcelluloses, particularly hydroxypropyl methylcelluloses, have been found which do not need to be dissolved in cooled water to provide good hardness and/or cohesion to solid food compositions.

One aspect of the present invention is a food composition which comprises a cellulose ether, wherein the ether substituents in the cellulose ether are methyl groups, hydroxyalkyl groups, and optionally alkyl groups being different from methyl, the cellulose ether has a DS(methyl) of from 1.65 to 2.20, an MS(hydroxyalkyl) of from 0.10 to 1.00, and hydroxy groups of anhydroglucose units are substituted with methyl groups such that $[s23/s26-0.2*MS(hydroxyalkyl)]$ is 0.35 or less, wherein $s23$ is the molar fraction of anhydroglucose units wherein only the two hydroxy groups in the 2- and 3-positions of the anhydroglucose unit are substituted with methyl groups and wherein $s26$ is the molar fraction of anhydroglucose units wherein only the two hydroxy groups in the 2- and 6-positions of the anhydroglucose unit are substituted with methyl groups.

Another aspect of the invention is the use of the above-mentioned cellulose ether for improving one or more of the properties of a food composition selected from cohesion, firmness, juiciness, freeze thaw stability or texture; resistance to shrinking during cooking, or boil-out control.

Yet another aspect of the invention is a method of improving one or more of the properties of a food composition selected from cohesion, firmness, juiciness, freeze thaw stability or texture; resistance to shrinking during cooking, or boil-out control, which method comprises the step of incorporating an above-mentioned cellulose ether into the food composition.

DETAILED DESCRIPTION

The food of the present invention comprises a cellulose ether wherein the ether substituents are methyl groups, hydroxyalkyl groups, and optionally alkyl groups which are different from methyl. The hydroxyalkyl groups can be the same or different from each other. Preferably the cellulose ether comprises one or two kinds of hydroxyalkyl groups, more preferably one or more kinds of hydroxy-$C_{1-3}$-alkyl groups, such as hydroxypropyl and/or hydroxyethyl. Useful optional alkyl groups are, e.g., ethyl or propyl, ethyl being preferred. Preferred ternary cellulose ethers of the present invention are ethyl hydroxypropyl methyl celluloses, ethyl hydroxyethyl methyl celluloses, or hydroxyethyl hydroxypropyl methyl celluloses. Preferred cellulose ethers are hydroxyalkyl methyl celluloses, particularly hydroxy-$C_{1-3}$-alkyl methyl celluloses, such as hydroxypropyl methylcelluloses or hydroxyethyl methylcelluloses.

An essential feature of the cellulose ethers is their unique distribution of methyl groups on the anhydroglucose units such that [s23/s26−0.2*MS(hydroxyalkyl)] is 0.35 or less, preferably 0.32 or less, more preferably 0.30 or less, most preferably 0.27 or less, particularly 0.25 or less, and especially 0.23 or less. Typically [s23/s26−0.2*MS(hydroxyalkyl)] is 0.07 or more, more typically 0.10 or more, and most typically 0.13 or more. More specifically, in the case of hydroxyethyl methylcelluloses the upper limit for [s23/s26−0.2*MS(hydroxyalkyl)] is 0.35; preferably 0.32, more preferably 0.30 and most preferably 0.27. In the case of hydroxypropyl methylcelluloses the preferred upper limit for [s23/s26−0.2*MS(hydroxyalkyl)] generally is 0.30, preferably 0.27; more preferably 0.25 and most preferably 0.23. As used herein, the symbol "*" represents the multiplication operator.

In the ratio s23/s26, s23 is the molar fraction of anhydroglucose units wherein only the two hydroxy groups in the 2- and 3-positions of the anhydroglucose unit are substituted with methyl groups and s26 is the molar fraction of anhydroglucose units wherein only the two hydroxy groups in the 2- and 6-positions of the anhydroglucose unit are substituted with methyl groups. For determining the s23, the term "the molar fraction of anhydroglucose units wherein only the two hydroxy groups in the 2- and 3-positions of the anhydroglucose unit are substituted with methyl groups" means that the 6-positions are not substituted with methyl; for example, they can be unsubstituted hydroxy groups or they can be substituted with hydroxyalkyl groups, methylated hydroxyalkyl groups, alkyl groups different from methyl or alkylated hydroxyalkyl groups. For determining the s26, the term "the molar fraction of anhydroglucose units wherein only the two hydroxy groups in the 2- and 6-positions of the anhydroglucose unit are substituted with methyl groups" means that the 3-positions are not substituted with methyl; for example, they can be unsubstituted hydroxy groups or they can be substituted with hydroxyalkyl groups, methylated hydroxyalkyl groups, alkyl groups different from methyl or alkylated hydroxyalkyl groups.

Formula I below illustrates the numbering of the hydroxy groups in anhydroglucose units. Formula I is only used for illustrative purposes and does not represent the cellulose ethers of the invention; the substitution with hydroxyalkyl groups is not shown in Formula I.

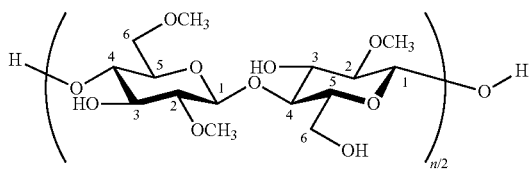

Formula I

The cellulose ether has a DS(methyl) of from 1.65 to 2.20, preferably from 1.70 to 2.10, and more preferably from 1.75 to 2.05. The degree of the methyl substitution, DS(methyl), of a cellulose ether is the average number of OH groups substituted with methyl groups per anhydroglucose unit. For determining the DS(methyl), the term "OH groups substituted with methyl groups" does not only include the methylated OH groups at the polymer backbone, i.e., that are directly a part of the anhydroglucose unit, but also methylated OH groups that have been formed after hydroxyalkylation.

The cellulose ether has an MS(hydroxyalkyl) of from 0.10 to 1.00, generally from 0.15 to 0.80, preferably from 0.20 to 0.70, more preferably from 0.22 to 0.60, and most preferably from 0.22 to 0.50 and particularly from 0.25 to 0.40. The degree of the hydroxyalkyl substitution is described by the MS (molar substitution). The MS(hydroxyalkyl) is the average number of hydroxyalkyl groups which are bound by an ether bond per mole of anhydroglucose unit. During the hydroxyalkylation, multiple substitutions can result in side chains.

The cellulose ether is preferably a hydroxypropyl methyl cellulose. More preferably the cellulose ether is preferably a hydroxypropyl methyl cellulose having a DS(methyl) of from 1.70 to 2.10, more preferably from 1.75 to 2.05, and an MS(hydroxypropyl) of from 0.15 to 0.80, more preferably from 0.20 to 0.70, more preferably from 0.22 to 0.60, and most preferably from 0.22 to 0.50 and particularly from 0.25 to 0.40.

The determination of the % methoxyl and % hydroxypropoxyl in hydroxypropyl methylcellulose is carried out according to the United States Pharmacopeia (USP 32). The values obtained are % methoxyl and % hydroxypropoxyl. These are subsequently converted into degree of substitution (DS) for methyl substituents and molar substitution (MS) for hydroxypropyl substituents. Residual amounts of salt have been taken into account in the conversion. The DS(methyl) and MS(hydroxyethyl) in hydroxyethyl methylcellulose is effected by Zeisel cleavage with hydrogen iodide followed by gas chromatography. (G. Bartelmus and R. Ketterer, Z. Anal. Chem. 286 (1977) 161-190).

In one aspect of the present invention the viscosity of the cellulose ether is more than 150 mPa·s, preferably from 500 to 200,000 mPa·s, more preferably from 500 to 100,000 mPa·s, most preferably from 1000 to 80,000, particularly from 1000 to 60,000, determined in a 1.5% by weight aqueous solution at 20° C. in a Haake RS600 rheometer with a cone and plate Geometry (CP-60/2°) at 20° C. and at a shear rate of 2.55 s$^{-1}$.

To characterize the temperature dependent properties of the precipitation or gelation of a 1.5 weight percent aqueous solution of the cellulose ether, an Anton Paar Physica MCR 501 rheometer (Ostfildern, Germany) with a Cup & Bob set-up (CC-27) and a peltier temperature control system was used in oscillation shear flow. Details of the measurements are described in the Example section.

It has surprisingly been found that the above described cellulose ethers which have a viscosity of more than 150 mPa·s, determined in a 1.5% by weight aqueous solution at 20° C. and a shear rate of 2.55 s$^{-1}$ as defined above, have a surprisingly high gel strength. When an aqueous solution of the cellulose ether is characterized by G'/G''≥1, i.e. when it forms a gel, the gel strength is measured as storage modulus G'. Cellulose ethers in the food composition of the present invention which have a viscosity of more than 150 mPa·s, determined in a 1.5% by weight aqueous solution at 20° C. and a shear rate of 2.55 s$^{-1}$, generally have a storage modulus G' of at least 50 Pa, preferably at least 100 Pa, more preferably at least 150 Pa, and most preferably at least 200 Pa, measured as a 1.5 weight percent aqueous solution at 80° C. Such a storage modulus G' is generally even achieved when the MS(hydroxyalkyl) is within the range of >0.30 and up to 1.00, more typically up to 0.80, most typically up to 0.60. When the MS(hydroxyalkyl) is within the range of 0.05 to 0.30, the cellulose ether generally has a storage modulus G' of at least 100 Pa, preferably at least 150 Pa, more preferably at least 200 Pa, most preferably at least 250 Pa, and in many cases even at least 300 Pa, measured as a 1.5 weight percent aqueous solution at 80° C. Under optimized conditions storage moduli of up to 20,000 Pa, typically of up to 10,000 Pa, and more typically of up to 5,000 Pa, measured as a 1.5 weight percent aqueous solution at 80° C. can be achieved. The gel strength of the above described cellulose ethers which have a viscosity of more than 150 mPa·s, determined in a 1.5% by weight aqueous solution at 20° C. and a shear rate of 2.55 s$^{-1}$ as defined above, is higher than the gel strength of comparative known cellulose ethers having a comparable viscosity and types and percentages of substitution. This makes the above described cellulose ethers highly advantageous in food compositions; they provide good firmness/hardness and good cohesion to solid food compositions, particularly to solid food compositions designed to be heat-treated. Heat-treatment can be carried out at standard temperatures known for the various ways of cooking, such as baking (e.g. 50-250° C.), frying (e.g. 150-190° C.), grilling (e.g. 160-300° C.) or roasting (e.g., 50-300° C.). The hardness and the cohesion of the food compositions designed to be heat-treated are typically measured after heat-treatment, preferably in a texture analyzer as described in the Examples.

Furthermore, it has been surprisingly found that the above described cellulose ethers, also those which have a viscosity of more than 150 mPa·s, determined in a 1.5% by weight aqueous solution at 20° C. and a shear rate of 2.55 s$^{-1}$ as defined above, enable sufficient water release in solid food compositions, such that the food composition of the present invention exhibit good juiciness. The juiciness is preferably measured after heat-treatment as described above.

Methods of making cellulose ethers which are useful in food compositions of the present invention are described in detail in the Examples. Some aspects of the process for making the cellulose ethers are described in more general terms below.

Generally speaking, cellulose pulp or, as the reaction of cellulose pulp to the hydroxyalkyl methyl cellulose proceeds, to partially reacted cellulose pulp, is alkalized in two or more stages, preferably in two or three stages, in one or more reactors with an aqueous alkaline solution of an alkali metal hydroxide, more preferably sodium hydroxide. The aqueous alkaline solution preferably has an alkali metal hydroxide content of from 30 to 70 percent, more preferably from 35 to 60 percent, most preferably from 48 to 52 percent, based on the total weight of the aqueous alkaline solution.

In one embodiment, an organic solvent such as dimethyl ether is added to the reactor as a diluent and a coolant. Likewise, the headspace of the reactor is optionally purged with an inert gas (such as nitrogen) to control oxygen-catalyzed depolymerization of the cellulose ether product.

Typically from 1.2 to 2.0 molar equivalents of alkali metal hydroxide per mole of anhydroglucose units in the cellulose are added in the first stage. Uniform swelling and distribution in the pulp is optionally controlled by mixing and agitation. In the first stage the rate of addition of the alkali metal hydroxide agent is not very critical. It can be added in several portions, e.g., in 2 to 4 portions, or continuously. The temperature at the first stage of contacting the alkali metal hydroxide with the cellulose pulp is typically maintained at or below about 45° C. The first stage of alkalization typically lasts from 15 to 60 minutes.

A methylating agent, such as methyl chloride or dimethyl sulfate is also added to the cellulose pulp, typically after the addition of the alkali metal hydroxide. The total amount of the methylating agent is generally from 2 to 5.3 mols per mole of anhydroglucose units. The methylating agent can be added to the cellulose or, as the reaction of cellulose pulp to the hydroxyalkyl methyl cellulose proceeds, to partially reacted cellulose pulp, in a single stage, but it is preferably added in two or more stages, more preferably two or three stages, most preferably two stages.

If the methylating agent is added in a single stage, it is generally added in an amount of from 3.5 to 5.3 moles of methylating agent per mole of anhydroglucose units, but in any event it is added in at least an equimolar amount, compared to the added total molar amount of alkali metal hydroxide, before heating the reaction mixture. If the methylating agent is added in a single stage, it is preferably added at a rate of from 0.25 to 0.5 molar equivalents of methylating agent per mole of anhydroglucose units per minute.

If the methylating agent is added in two stages, in the first stage it is generally added in an amount of from 2 to 2.5 moles of methylating agent per mole of anhydroglucose units before heating the reaction mixture, but in any event it is added in at least an equimolar amount, compared to the molar amount of alkali metal hydroxide added in the first stage of alkali metal hydroxide addition. If the methylating agent is added in two stages, the methylating agent of the first stage is preferably added at a rate of from, 0.25 to 0.5 molar equivalents of methylating agent per mole of anhydroglucose units per minute. The methylating agent of the single stage or of the first stage may be pre-mixed with the suspending agent. In this case the mixture of suspending agent and methylating agent preferably comprises from 20 to 50 weight percent, more preferably from 30 to 50 weight percent, of the suspending agent, based on the total weight of methylating agent and suspending agent. Once the cellulose has been contacted with the alkali metal hydroxide and methylating agent, the reaction temperature is typically increased over a time period of 30 to 80 minutes, more typically of 50 to 70 minutes, to a temperature of about 70-85° C., preferably about 75-80° C., and reacted at this temperature for 10 to 30 minutes.

If the methylating agent is added in two stages, the second stage of methylating agent is generally added to the reaction mixture after having heated the reaction mixture to a temperature of about 70-85° C. for 10 to 30 minutes. The methylating agent of second stage is generally added in an amount of from 1.5 to 3.4 moles per mole of anhydroglucose units, but in any event it is added in at least an equimolar amount, compared to the molar amount of alkali metal hydroxide present in the reaction mixture. Accordingly, the methylating agent of the second stage, if any, is added to the reaction mixture before or during the second and optionally third stage of alkali metal hydroxide addition in such a manner that the alkali metal hydroxide is not contacted in excess amounts with the cellulose pulp. The methylating agent of the second stage is preferably added at a rate of from 0.25 to 0.5 molar equivalents of methylating agent per mole of anhydroglucose units per minute. If the methylating agent is added in two stages, the molar ratio between the methylating agent of the first stage and the methylating agent of the second stage is generally from 0.68:1 to 1.33:1.

If the alkali metal hydroxide is added in two stages, typically from 1.0 to 2.9 molar equivalents of alkali metal hydroxide per mole of anhydroglucose units are added in the second stage, after the addition of the methylating agent of the single stage or first stage and simultaneously with or after the addition of the methylating agent of the second stage, if any. The molar ratio between the alkali metal hydroxide of the first stage and the alkali metal hydroxide of the second stage generally is from 0.6:1 to 1.2:1. It is important to add the alkali metal hydroxide used in the second stage slowly, i.e., at a rate of less than 0.04, typically at a rate of less than 0.03 molar equivalents of alkali metal hydroxide per mole of anhydroglucose units per minute. The alkali metal hydroxide of the second stage is generally added at a temperature of from 55 to 80° C., preferably from 65 to 80° C.

As an alternative to the procedure above wherein the methylating agent and alkali metal hydroxide each are added in two stages, the methylating agent of the second stage is added to the reaction mixture after a portion of the alkali metal hydroxide of the second stage has been added, followed by subsequent addition of alkali metal hydroxide; i.e., the methylating agent is added in a second stage, which is followed by the addition of a third stage of alkali metal hydroxide. In this embodiment of the process, the total amount of alkali metal hydroxide per mole of anhydroglucose added in the second and third stage is generally 1.0 to 2.9 moles per mole of anhydroglucose units, of which preferably 40 to 60 percent are added in the second stage and 60 to 40 percent are added in the third stage. Preferably the alkali metal hydroxide used in the third stage is added slowly, i.e., at a rate of less than 0.04, typically at a rate of less than 0.03 molar equivalents of alkali metal hydroxide per mole of anhydroglucose units per minute. The methylating agent and alkali metal hydroxide of the third stage are generally added at a temperature of from 55 to 80° C., preferably from 65 to 80° C.

One or more, preferably one or two, hydroxyalkylating agents, such as ethylene oxide and/or propylene oxide are also added to the cellulose pulp, or, as the reaction of cellulose pulp to the hydroxyalkyl methyl cellulose proceeds, to partially reacted cellulose pulp, either before, after, or concurrently with the alkali metal hydroxide added in the first stage. Preferably only one hydroxyalkylating agent is used. The hydroxyalkylating agent is generally added in an amount of 0.2 to 2.0 mole of hydroxyalkylating agent per mole of anhydroglucose units. The hydroxyalkylating agent is advantageously added before heating the reaction mixture to the reaction temperature, i.e. at a temperature of from 30 to 80° C., preferably from 45 to 80° C.

An additional alkylating agent, different from a methylating agent, may also be added to the cellulose pulp, either before, after, or concurrently with the alkali metal hydroxide added in the first stage. A useful alkylating agent is an ethylating agent, such as ethyl chloride. The additional alkylating agent is generally added in an amount of 0.5 to 6 moles of alkylating agent per mole of anhydroglucose units. The alkylating agent is advantageously added before heating the reaction mixture to the reaction temperature, i.e. at a temperature of from 30 to 80° C., preferably from 45 to 80° C.

The cellulose ether is washed to remove salt and other reaction by-products. Any solvent in which salt is soluble may be employed, but water is preferred. The cellulose ether may be washed in the reactor, but is preferably washed in a separate washer located downstream of the reactor. Before or after washing, the cellulose ether may be stripped by exposure to steam to reduce residual organic content.

The cellulose ether is dried to a reduced moisture and volatile content of preferably about 0.5 to about 10.0 weight percent water and more preferably about 0.8 to about 5.0 weight percent water and volatiles, based upon the sum of the weight of cellulose ether and the volatiles. The reduced moisture and volatiles content enables the cellulose ether to be milled into particulate form. The cellulose ether is milled to particulates of desired size. If desired, drying and milling may be carried out simultaneously.

Cellulose ethers are typically incorporated in food compositions at levels of 0.05 to 10 percent, preferably from 0.1 to 8 percent, more preferably from 0.2 to 5 percent, and most preferably from 0.5 to 2 percent, based upon the total weight of the food composition.

The cellulose ethers described herein are preferably incorporated in solid food compositions, particularly in solid food compositions designed to be heat-treated, such as food compositions to be fried, roasted, grilled, cooked, baked or poached. Preferred food compositions are vegetable, meat, fish and soy patties and balls, vegetable, meat, fish and soy sausages, shaped vegetable, meat, fish and soy products, reformed seafood; reformed cheese sticks; onion rings; pie filling; pasta fillings, heated and baked sweet and savory fillings, starch based fried, baked, grilled, roasted, cooked, baked and poached products, meat analogues, shaped potato products, such as croquettes, pommes duchesses, hash browns, pancakes, waffles, and cakes; chewing sweets, pet foods; leavened and unleavened baked goods, such as breads; and the like. In a preferred aspect of the invention, the food composition is a proteinaceous food composition, particularly proteinaceous vegetarian food, such as soy sausages and patties, meatless meatballs and tofu turkey rolls.

In forming food compositions, the cellulose ether is typically admixed with foodstuffs during the process and formation of the compositions. The food composition of the present invention can be a frozen shaped or pre-cut product, an uncooked premix or a shaped or pre-cut cooked product, such as a fried, roasted, grilled, cooked or poached product. The above-described cellulose ether provides excellent stability of the food composition during and after cooking. The above-described cellulose ether can be the only cellulose ether to be included in the food composition. Alternatively, one or more other cellulose ethers, such as those described in European Patent EP 1 171 471 can also be incorporated in a food composition of the present invention, preferably in a amount of from 0.5 to 2 percent, based on the total weight of the food composition.

The foodstuff composition may be in any known form such as particle form or unitary form. Excellent general teachings to the preparation of food compositions with cellulose ethers are found in the following METHOCEL™ (trademark of The Dow Chemical Company) product publications: METHOCEL Premium Food Gums, Form Nos. 192-1037-87, 192-1047-87, 192-1046-87, 192-1051-87, 192-1050-87, 192-1049-87, 192-1053-87, 192-982-87, 192-979-87, 192-985-87, 192-1054-87, 192-1048-87, 192-987-87, 192-986-87, 192-989-87, 192-988-87, 192-87, 192-983-87, 192-981-87, 192-991-87, 192-980-87, 192-990-87, and 192-1052-87 (all published in 1987); Selecting METHOCEL Food Gums, Form No. 192-855-1281R (published in 1981); METHOCEL Food Gums In Fried Foods, Form Nos. 192-875-482 and 192-881-482 (all published in 1982); and METHOCEL Food Gums In Bakery Products, Form Nos. 192-874-482 and 192-878-482 (all published in 1982). solid food compositions designed to be heat-treated.

EXAMPLES

The following examples are for illustrative purposes only and are not intended to limit the scope of the present invention. All percentages are by weight unless otherwise specified.

Example 1

Hydroxypropyl methylcellulose (HPMC) is produced according to the following procedure. Finely ground wood cellulose pulp is loaded into a jacketed, agitated reactor. The reactor is evacuated and purged with nitrogen to remove oxygen and then evacuated again. The reaction is carried out in two stages. In the first stage a 50 weight percent aqueous solution of sodium hydroxide is sprayed onto the cellulose in an amount of 2.0 moles of sodium hydroxide per mole of anhydroglucose units in the cellulose and the temperature is adjusted to 40° C. After stirring the mixture of aqueous sodium hydroxide solution and cellulose for about 20 minutes at 40° C., 1.5 moles of dimethyl ether, 2.5 moles of methyl chloride and 0.8 mols of propylene oxide per mole of anhydroglucose units are added to the reactor. The contents of the reactor are then heated in 60 min to 80° C. After having reached 80° C., the first stage reaction is allowed to proceed for 30 min.

The second stage of the reaction is started by addition of methyl chloride in an amount of 2.8 molar equivalents of methyl chloride per mole of anhydroglucose units. The addition time for methyl chloride is 10 min. Then a 50 weight percent aqueous solution of sodium hydroxide at an amount of 2.3 moles of sodium hydroxide per mole of anhydroglucose units is added over a time period of 90 min. The rate of addition is 0.026 moles of sodium hydroxide per mole of anhydroglucose units per minute. After the second stage addition is completed the contents of the reactor are then kept at a temperature of 80° C. for 120 min.

After the reaction, the reactor is vented and cooled down to about 50° C. The contents of the reactor are removed and transferred to a tank containing hot water. The crude HPMC is then neutralized with formic acid and washed chloride free with hot water (assessed by $AgNO_3$ flocculation test), cooled to room temperature and dried at 55° C. in an air-swept drier. The material is then ground using an Alpine UPZ mill using a 0.5 mm screen.

Example 2

Example 1 is repeated, except the amount of propylene oxide added to the reaction mixture is 0.6 mols of propylene oxide per mole of anhydroglucose units.

Example 3

Example 1 is repeated, except the amount of propylene oxide added to the reaction mixture is 0.4 mols of propylene oxide per mole of anhydroglucose units.

Comparative Example A

A methylcellulose is used which is commercially available from The Dow Chemical Company under the Trademark Methocel SG A16M and produced as disclosed in European Patent EP 1 171 471.

Comparative Example B

A methylcellulose is used which is commercially available from The Dow Chemical Company under the Trademark Methocel SG A16M and produced as disclosed in European Patent EP 1 171 471. The methylcellulose of Comparative Example B has been produced in a different batch than the methylcellulose of Comparative Example A.

Comparative Example C

A hydroxypropyl methylcellulose is used which is commercially available from The Dow Chemical Company under the Trademark Methocel E4M.

Comparative Example D

A hydroxypropyl methylcellulose is used which is commercially available from The Dow Chemical Company under the Trademark Methocel F4M.

Comparative Example E

A hydroxypropyl methylcellulose is used which is commercially available from The Dow Chemical Company under the Trademark Methocel K4M.

Comparative Example F

Example 1 is repeated, except the amount of sodium hydroxide in the first stage is 1.2 mols per mole of anhydroglucose units, the amount of methyl chloride in the first stage is 2.0 mols per mole of anhydroglucose units, the amount of sodium hydroxide in the second stage is 1.0 mols per mole of anhydroglucose units, the amount of methyl chloride in the second stage is 1.5 mols per mole of anhydroglucose units and the amount of propylene oxide added to the reaction mixture is 0.4 mols of propylene oxide per mole of anhydroglucose units.

Comparative Example G

A hydroxypropyl methylcellulose is used which is commercially available from The Dow Chemical Company under the Trademark Methocel E10M.

Preparation of Homogeneous Solutions of the Cellulose Ether

To achieve homogenous solutions, 3 g of the cellulose ether powder (under consideration of the water content of the cellulose ether) is suspended in 197 g water at 70° C. with an overhead laboratory stirrer at 700 rpm for 10 min. These solutions are then cooled to a temperature of 4° C. for 5 hours to complete the dissolution process. During these 5 hours the solutions are stirred at 500-1000 rpm and lost water due to evaporation is replaced. These solutions are then stored in a refrigerator overnight. Prior to the analysis the cold solutions are stirred for 15 min at 100 rpm.

The viscosities of the hydroxypropyl methylcellulose is determined in a 1.5% by weight aqueous solution at 20° C. in a Haake RS600 rheometer with a cone and plate Geometry (CP-60/2°) at 20° C. and at a shear rate of 2.55 $s^{-1}$.

The determination of the % methoxyl and % hydroxypropoxyl in hydroxypropyl methylcellulose is carried out according to the United States Pharmacopeia (USP 32). The values obtained are % methoxyl and % hydroxypropoxyl. These are subsequently converted into degree of substitution (DS) for methyl substituents and molar substitution (MS) for hydroxypropyl substituents. Residual amounts of salt have been taken into account in the conversion.

The DS(methyl) and MS(hydroxyethyl) in hydroxyethyl methylcellulose is effected by Zeisel cleavage with hydrogen iodide followed by gas chromatography. (G. Bartelmus and R. Ketterer, Z. Anal. Chem. 286 (1977) 161-190).

Determination of s23/s26

The determination of ether substituents in cellulose ethers is generally known and e.g., described in Carbohydrate Research, 176 (1988) 137-144, Elsevier Science Publishers B.V., Amsterdam, DISTRIBUTION OF SUBSTITUENTS IN O-ETHYL-O-(2-HYDROXYETHYL)CELLULOSE by Bengt Lindberg, Ulf Lindquist, and Olle Stenberg.

Specifically, determination of s23/s26 is conducted as follows:

10-12 mg of the cellulose ether are dissolved in 4.0 mL of dry analytical grade dimethyl sulfoxide (DMSO) (Merck, Darmstadt, Germany, stored over 0.3 nm molecular sieve beads) at about 90° C. under stirring and then cooled down to room temperature again. The solution is left stirring at room temperature over night to ensure complete solubilization. The entire reaction including the solubilization of the cellulose ether is performed using a dry nitrogen atmosphere in a 4 mL screw cap vial. After solubilization the dissolved cellulose ether is transferred to a 22 mL screw cap vial. Powdered sodium hydroxide (freshly pestled, analytical grade, Merck, Darmstadt, Germany) and ethyl iodide (for synthesis, stabilized with silver, Merck-Schuchardt, Hohenbrunn, Germany) in a thirty fold molar excess of the reagents sodium hydroxide and ethyl iodide per hydroxyl group of the anhydroglucose unit are added and the solution is vigorously stirred under nitrogen in the dark for three days at ambient temperature. The perethylation is repeated with addition of the threefold amount of the reagents sodium hydroxide and ethyl iodide compared to the first reagent addition and further stirring at room temperature for additional two days. Optionally the reaction mixture can be diluted with up to 1.5 mL DMSO to ensure good mixing during the course of the reaction. 5 mL of 5% aqueous sodium thiosulfate solution is poured into the reaction mixture and the obtained solution is then extracted three times with 4 mL of dichloromethane. The combined extracts are washed three times with 2 mL of water. The organic phase is dried with anhydrous sodium sulfate (ca. 1 g). After filtration the solvent is removed in a gentle stream of nitrogen and the sample is stored at 4° C. until further sample preparation.

Hydrolysis of about 5 mg of the perethylated samples is performed under nitrogen in a 2 mL screw cap vial with 1 mL of 90% aqueous formic acid under stirring at 100° C. for 1 hour. The acid is removed in a stream of nitrogen at 35-40° C. and the hydrolysis is repeated with 1 mL of 2M aqueous trifluoroacetic acid for 3 hours at 120° C. in an inert nitrogen atmosphere under stirring. After completion the acid is removed to dryness in a stream of nitrogen at ambient temperature using ca. 1 mL of toluene for co-distillation.

The residues of the hydrolysis are reduced with 0.5 mL of 0.5 M sodium borodeuteride in 2N aqueous ammonia solution (freshly prepared) for 3 hours at room temperature under stirring. The excess reagent is destroyed by drop wise addition of ca. 200 µL of concentrated acetic acid. The resulting solution is evaporated to dryness in a stream of nitrogen at ca. 35-40° C. and subsequently dried in vacuum for 15 min at room temperature. The viscous residue is dissolved in 0.5 mL of 15% acetic acid in methanol and evaporated to dryness at room temperature. This is done five times and repeated four times with pure methanol. After the final evaporation the sample is dried in vacuum overnight at room temperature.

The residue of the reduction is acetylated with 600 µL of acetic anhydride and 150 µL of pyridine for 3 hrs at 90° C. After cooling the sample vial is filled with toluene and evaporated to dryness in a stream of nitrogen at room temperature. The residue is dissolved in 4 mL of dichloromethane and poured into 2 mL of water and extracted with 2 mL of dichloromethane. The extraction is repeated three times. The combined extracts are washed three times with 4 mL of water and dried with anhydrous sodium sulfate. The dried dichloromethane extract is subsequently submitted to GC analysis. Depending on the sensitivity of the GC system, a further dilution of the extract can be necessary.

Gas-liquid (GLC) chromatographic analyses are performed with Hewlett Packard 5890A and 5890A Series II type of gas chromatographs equipped with J&W capillary columns DB5, 30 m, 0.25 mm ID, 0.25 µm phase layer thickness operated with 1.5 bar helium carrier gas. The gas chromatograph is programmed with a temperature profile that holds constant at 60° C. for 1 min, heats up at a rate of 20° C./min to 200° C., heats further up with a rate of 4° C./min to 250° C., heats further up with a rate of 20° C./min to 310° C. where it is held constant for another 10 min. The injector temperature is set to 280° C. and the temperature of the flame ionization detector (FID) is set to 300° C. 1 µL of the samples is injected in the splitless mode at 0.5 min valve time. Data are acquired and processed with a LabSystems Atlas work station.

Quantitative monomer composition data are obtained from the peak areas measured by GLC with FID detection. Molar responses of the monomers are calculated in line with the effective carbon number (ECN) concept but modified as described in the table below. The effective carbon number (ECN) concept has been described by Ackman (R. G. Ackman, J. Gas Chromatogr., 2 (1964) 173-179 and R. F. Addison, R. G. Ackman, J. Gas Chromatogr., 6 (1968) 135-138) and applied to the quantitative analysis of partially alkylated alditol acetates by Sweet et. al (D. P. Sweet, R. H. Shapiro, P. Albersheim, Carbohyd. Res., 40 (1975) 217-225).

ECN Increments Used for ECN Calculations:

| Type of carbon atom | ECN increment |
| --- | --- |
| hydrocarbon | 100 |
| primary alcohol | 55 |
| secondary alcohol | 45 |

In order to correct for the different molar responses of the monomers, the peak areas are multiplied by molar response factors MRFmonomer which are defined as the response relative to the 2,3,6-Me monomer. The 2,3,6-Me monomer is chosen as reference since it is present in all samples analyzed in the determination of s23/s26.

MRFmonomer=ECN2,3,6-Me/ECNmonomer

The mole fractions of the monomers are calculated by dividing the corrected peak areas by the total corrected peak area according to the following formulas:

$$s23=[(23\text{-Me}+23\text{-Me-6-HAMe}+23\text{-Me-6-HA}+23\text{-Me-6-HAHAMe}+23\text{-Me-6-HAHA}]; \text{ and}$$

$$s26=[(26\text{-Me}+26\text{-Me-3-HAMe}+26\text{-Me-3-HA}+26\text{-Me-3-HAHAMe}+26\text{-Me-3-HAHA}], \text{ wherein}$$

s23 is the sum of the molar fractions of anhydroglucose units which meet the following conditions:
a) the two hydroxy groups in the 2- and 3-positions of the anhydroglucose unit are substituted with methyl groups and the 6-position is not substituted (=23-Me);
b) the two hydroxy groups in the 2- and 3-positions of the anhydroglucose unit are substituted with methyl groups and the 6-position is substituted with methylated hydroxyalkyl (=23-Me-6-HAMe) or with a methylated side chain comprising 2 hydroxyalkyl groups (=23-Me-6-HAHAMe); and
c) the two hydroxy groups in the 2- and 3-positions of the anhydroglucose unit are substituted with methyl groups and the 6-position is substituted with hydroxyalkyl (=23-Me-6-

HA) or with a side chain comprising 2 hydroxyalkyl groups (=23-Me-6-HAHA). s26 is the sum of the molar fractions of anhydroglucose units which meet the following conditions:
a) the two hydroxy groups in the 2- and 6-positions of the anhydroglucose unit are substituted with methyl groups and the 3-position is not substituted (=26-Me);
b) the two hydroxy groups in the 2- and 6-positions of the anhydroglucose unit are substituted with methyl groups and the 3-position is substituted with methylated hydroxyalkyl (=26-Me-3-HAMe) or with a methylated side chain comprising 2 hydroxyalkyl groups (=26-Me-3-HAHAMe); and
c) the two hydroxy groups in the 2- and 6-positions of the anhydroglucose unit are substituted with methyl groups and the 3-position is substituted with hydroxyalkyl (=26-Me-3-HA) or with a side chain comprising 2 hydroxyalkyl groups (=26-Me-3-HAHA).

The results of the determination of the substituents in the HAMC are listed in Table 2 below. In the case of HPMC's hydroxyalkyl (HA) is hydroxypropyl (HP) and methylated hydroxyalkyl (HAMe) is methylated hydroxypropyl (HPMe).

Determination of Storage Modulus G', Loss Modulus G"

To characterize the temperature dependent properties of the precipitation or gelation of a 1.5 weight percent aqueous cellulose ether solution, an Anton Paar Physica MCR 501 rheometer (Ostfildern, Germany) with a Cup & Bob set-up (CC-27) and a pettier temperature control system is used in oscillation shear flow. These solutions are prepared according to the same dissolution procedure as described for the viscosity measurements. The measurements are performed at a constant frequency of 2 Hz. and a constant strain (deformation amplitude) of 0.5% from 10° C. to 85° C. with a heating rate of 1° C./min with a data collection rate of 4 points/min. The storage modulus G', which is obtained from the oscillation measurements, represents the elastic properties of the solution. The loss modulus G", which is obtained from the oscillation measurements, represents the viscous properties of the solution. At low temperature the loss modulus values G" are higher than the storage modulus G' and both values are slightly decreasing with increasing temperatures. If a precipitation takes places at elevated temperatures the storage modulus drops down. With further increasing temperatures the storage modulus values are increasing and a cross-over between the storage modulus and the loss modulus is obtained. The cross-over of G' and G" is determined to be the gelation temperature.

The properties of the hydroxypropyl methyl celluloses (HPMC) of Examples 1 to 3, of the methyl cellulose of Comparative Example A and B and of the HPMC of Comparative Example C to G are listed in Tables 1 and 2 below.

TABLE 1

| Example | DS (methyl) | MS (hydroxy-propyl) | s23/s26-0.2 * MS(hydroxy-propyl) | Viscosity at 20° C. [2.55 s$^{-1}$] [mPa · s][1] | Loss Modulus G" at 80° C., [Pa][1] | Storage Modulus G' at 80° C., [Pa][1] |
|---|---|---|---|---|---|---|
| 1 | 1.83 | 0.28 | 0.16 | 7691 | 10.6 | 431 |
| 2 | 1.82 | 0.20 | 0.18 | 9110 | 22.7 | 1200 |
| 3 | 1.81 | 0.15 | 0.19 | 7753 | 25.9 | 1450 |
| A | 1.84 | — | n/a | 4790 | 69.2 | 3500 |
| B | 1.79 | — | n/a | 5170 | 77 | 3660 |
| C | 1.83 | 0.25 | 0.36 | 1464 | 0.5 | 5.0 |
| D | 1.83 | 0.17 | 0.40 | 1543 | 0.4 | 3.8 |
| E | 1.49 | 0.22 | 0.40 | 1367 | 0.5 | 1.4 |
| F | 1.44 | 0.19 | 0.16 | 4413 | 8.4 | 475 |
| G | 1.97 | 0.24 | 0.36 | 7150 | 3.3 | 73.9 |

[1] measured as 1.5 weight percent aqueous solution

TABLE 2

| | (Comparative) Example | | | | | | | |
|---|---|---|---|---|---|---|---|---|
| | 1 | 2 | 3 | C | D | E | F | G |
| DS (USP) | 1.83 | 1.82 | 1.81 | 1.83 | 1.83 | 1.49 | 1.44 | 1.97 |
| MS (USP) | 0.28 | 0.20 | 0.15 | 0.25 | 0.17 | 0.22 | 0.19 | 0.24 |
| mol fraction (26-Me) | 0.2709 | 0.2861 | 0.2984 | 0.2179 | 0.2298 | 0.1928 | 0.2615 | 0.2243 |
| mol fraction (26-Me-3-HA) | 0.0218 | 0.0161 | 0.0124 | 0.0216 | 0.0137 | 0.0144 | 0.0123 | 0.0200 |
| mol fraction (26-Me-3-HAHA) | 0.0000 | 0.0000 | 0.0000 | 0.0000 | 0.0000 | 0.0000 | 0.0000 | 0.0000 |
| mol fraction (26-Me-3HAMe) | 0.0034 | 0.0022 | 0.0019 | 0.0040 | 0.0023 | 0.0019 | 0.0006 | 0.00 |
| mol fraction (26-Me-3HAHAMe) | 0.0000 | 0.0000 | 0.0000 | 0.0000 | 0.0000 | 0.0000 | 0.0000 | 0.00 |
| mol fraction (23-Me) | 0.0542 | 0.0572 | 0.0600 | 0.0848 | 0.0972 | 0.0822 | 0.0461 | 0.0846 |
| mol fraction (23-Me-6-HA) | 0.0108 | 0.0091 | 0.0074 | 0.0139 | 0.0095 | 0.0103 | 0.0089 | 0.0141 |
| mol fraction (23-Me-6-HAHA) | 0.0000 | 0.0000 | 0.0000 | 0.0000 | 0.0000 | 0.0000 | 0.0000 | 0.0000 |
| mol fraction (23-Me-6-HAMe) | 0.0000 | 0.0000 | 0.0000 | 0.0000 | 0.0000 | 0.0000 | 0.0000 | 0.0000 |
| mol fraction (23-Me-6-HAHAMe) | 0.0000 | 0.0000 | 0.0000 | 0.0000 | 0.0000 | 0.0000 | 0.0000 | 0.0000 |
| s23/s26 | 0.22 | 0.22 | 0.22 | 0.41 | 0.43 | 0.44 | 0.20 | 0.40 |
| s23/s26-0.2 * MS | 0.16 | 0.18 | 0.19 | 0.36 | 0.40 | 0.40 | 0.16 | 0.40 |

Preparation of Soy Patties

Soy patties are produced from the following ingredients: 293.0 g of water, 125.0 g of IP Solus Natural Mince (textured soy protein concentrate), 50.0 g of vegetable oil (sun flower), 9.0 g of sugar beet syrup, 5.0 g of salt, 5.0 g (corresponding to 1%) of a cellulose ether of Examples 1 to 3 or Comparative Example A to G, 4.0 g of autolyzed yeast, 3.4 g of grill flavor, 3.0 g of minced onion, 0.2 g of nutmeg, 0.2 g of coriander, and 0.2 g of ground black pepper.

The soy patties are produced according to the following procedure:

In a first step, soy protein and 80.00 g of water having the temperature listed in Table 3 below (4° C. or 20° C.) are mixed in a Hobart mixer for three minutes at lowest speed using a cake paddle attachment. The mixture is let stand for exactly 3 minutes.

In a second step, the cellulose ether binder and spices are dry blended. The dry blend and 213 g of water listed in Table 3 below (4° C. or 20° C.) are added to the mixture resulting from the first step and blended for 3 minutes at lowest speed. The mixture is left to stand for 7 minutes. Oil is added and mixing is continued for additional 2 minutes.

Soy patties of a height of about 12 mm and a weight of 80 g each are prepared from the food composition at room temperature. The patties are frozen and packaged.

The soy patties are subsequently fried and visually inspected while frying. The temperature of the soy patties is measured every 30 seconds to fry the soy patties in a reproducible manner. The frozen soy patties are put in a heated frying pan having a diameter of 20 cm and a temperature of about 50° C. and containing 10 g of oil, to avoid sticking. As long as the soy patties are frozen their temperature is measured at the surface. When they are thawed, the temperature in the middle of the soy patties is measured. At the start of the frying process the surface temperature of the frozen soy patties is about 5° C. The temperature of the frying pan is increased to about 107° C. and the temperature of the soy patties increases to about 7.5° C. within 3 minutes of frying. After 3 min. and 30 seconds of frying, the soy patties are thawed and have a temperature of about 8° C. After 4 min., 4 min. 30 seconds and 5 min. respectively the temperature of the soy patties increases to about 11° C., 15° C. and 17° C. respectively. After 5 min. and 15 seconds of frying, the temperature of the frying pan is about 140° C. and the soy patties are turned upside down. After 6-7 min of frying the temperature of the soy patties increases to 42-43° C., after 7 min. and 30 seconds to 44° C. and after 8 min to 47° C. Frying of the soy patties is stopped after 8 min.

The hardness, cohesion and water release (a measure for juiciness) are measured as follows:

The fried soy patties are characterized by texture analyzer measurement at room temperature. A maximum compression of 65% is applied which simulates the compression in the mouth while eating.

Texture Analyzer: TA.XTplus, Stable Micro Systems, Godalming, Great Britain
The following conditions are used:
Compression: 65%
Compression rate: 1 mm/sec
Measuring sensor: P/50T; diameter 50 mm Teflon
Measuring cell: 50 kg The analyzer compresses the soy patty at a rate of 1 mm/sec until a compression of 65% is achieved and measures the applied force. The analyzer measures the displacement of the soy patty when subjected to an applied compression force and subsequent release of this force. In Table 3 below the main properties measured by the texture analyzer are listed. The patty hardness is the force measured at 65% compression. The paddy cohesion is the area under the force-vs.-time curve. Additionally the amount of water released due to force of the Texture Analyzer is measured. The water is absorbed by a filter paper (Whatman-Schleicher&Schuell, 0980/1, diameter 110 mm) below the soy patty.

TABLE 3

| Example | DS (USP) | MS (USP) | s23/s26− 0.2 * MS | Hardness, N | | Cohesion, kg * s | | Water release, g | |
|---|---|---|---|---|---|---|---|---|---|
| | | | | 4° C. | 20° C. | 4° C. | 20° C. | 4° C. | 20° C. |
| 1 | 1.83 | 0.28 | 0.16 | 142 | 145 | 40 | 41 | 1.6 | 1.5 |
| 2 | 1.82 | 0.20 | 0.18 | 146 | 127 | 45 | 36 | 1.4 | 1.4 |
| 3 | 1.81 | 0.15 | 0.19 | 161 | 124 | 48 | 34 | 1.6 | 1.6 |
| A | 1.84 | — | n/a | 136 | 125 | 44 | 35 | 1.2 | 1.6 |
| B | 1.79 | — | n/a | 163 | 108 | 55 | 30 | 1.3 | 1.4 |
| C | 1.83 | 0.25 | 0.36 | 107 | 126 | 36 | 41 | 1.4 | 1.5 |
| D | 1.83 | 0.17 | 0.40 | 114 | 124 | 37 | 37 | 1.4 | 1.5 |
| E | 1.49 | 0.22 | 0.40 | 100 | 109 | 30 | 37 | 1.4 | 1.2 |
| F | 1.44 | 0.19 | 0.16 | 135 | 108 | 43 | 29 | 1.4 | 1.2 |
| G | 1.97 | 0.24 | 0.36 | 101 | 100 | 31 | 29 | 1.5 | 1.8 |

The comparison between Examples 1-3 on the one hand and Comparative Examples A and B on the other hand illustrates that the food compositions of the present invention have a similar and in some cases a better (higher) hardness and/or cohesion when preparing the solid food composition either with water of 4° C. or of 20° C. as compared to a comparative food composition comprising a methyl cellulose disclosed in European Patent EP 1 171 471.

The comparison between Examples 1-3 on the one hand and Comparative Examples C, D and G on the other hand illustrates that hydroxyalkyl methyl celluloses, particularly hydroxypropyl methyl celluloses (HPMC) provide a better hardness and cohesion to solid food compositions at similar DS(methyl) and MS(hydroxyalkyl) when [s23/s26− 0.2*MS] is 0.35 or less than when it is higher than 0.35. When using cooled water, e.g. having a temperature of 4° C. for producing the food composition, the higher hardness and cohesion is particularly significant, but in some cases a higher hardness and/or cohesion is also achieved when using non-cooled water, e.g. of 20° C. Achieving a higher hardness even when using non-cooled water is highly desirable and convenient to food producers.

The comparison between Examples 1-3 on the one hand and Comparative Examples E and F on the other hand illustrates the importance that hydroxyalkyl methyl celluloses, particularly hydroxypropyl methyl celluloses (HPMC) have a DS(methyl) of from 1.65-2.20 to provide a good hardness and/or cohesion when preparing the solid food composition.

What is claimed is:

1. A food composition comprising a cellulose ether, wherein ether substituents in the cellulose ether are methyl groups and one kind of hydroxyalkyl groups, the cellulose ether has a DS(methyl) of from 1.65 to 2.20, an MS(hydroxyalkyl) of from 0.10 to 1.00, and hydroxy groups of anhydroglucose units are substituted with methyl groups such that s23/s26−0.2*MS(hydroxyalkyl) is 0.30 or less, wherein s23 is the molar fraction of anhydroglucose units wherein only the two hydroxy groups in the 2- and 3-positions of the anhydroglucose unit are substituted with methyl groups and wherein s26 is the molar fraction of anhydroglucose units wherein only the two hydroxy groups in the 2- and 6-positions of the anhydroglucose unit are substituted with methyl groups and the amount of the cellulose ether is from 0.05 to 10 percent, based upon the total weight of the food composition.

2. The food composition of claim 1 wherein the cellulose ether is a hydroxypropyl methyl cellulose.

3. The food composition of claim 2 wherein the s23/s26−0.2*MS(hydroxyalkyl) is 0.27 or less.

4. The food composition of claim 3 wherein the hydroxypropyl methyl cellulose has the DS(methyl) of from 1.70 to 2.10.

5. The food composition of claim 4 wherein the hydroxypropyl methyl cellulose has a MS(hydroxypropyl) of from 0.15 to 0.80.

6. The food composition of claim 5 wherein the hydroxypropyl methyl cellulose has a viscosity of more than 150 mPa·s, measured as a 1.5 wt.-% solution in water at 20° C. at a shear rate of 2.55 s$^{-1}$.

7. The food composition of claim 1 wherein the s23/s26−0.2*MS(hydroxyalkyl) is 0.27 or less.

8. The food composition of claim 1 wherein the cellulose ether has the DS(methyl) of from 1.70 to 2.10.

9. The food composition of claim 1 wherein the cellulose ether is a hydroxypropyl methyl cellulose having the DS(methyl) of from 1.70 to 2.10 and an MS(hydroxypropyl) of from 0.15 to 0.80.

10. The food composition of claim 1 wherein the cellulose ether has a viscosity of more than 150 mPa·s, measured as a 1.5 wt.-% solution in water at 20° C. at a shear rate of 2.55 s$^{-1}$.

11. The food composition of claim 1 wherein the cellulose ether is present in an amount of from 0.2 to 5 percent, based on the weight of the food composition.

12. The food composition of claim 1 being a solid food composition.

13. The food composition of claim 1 being a proteinaceous food composition.

14. The food composition of claim 1 being a soy patty.

15. A method of improving one or more of the properties of a food composition selected from cohesion, firmness, juiciness, freeze thaw stability or texture; resistance to shrinking during cooking, or boil-out control, which method comprises the step of incorporating a cellulose ether set forth in claim 1 into the food composition at an amount of from 0.05 to 10 percent, based upon the total weight of the food composition.

16. The method of claim 15 for improving one or more of the properties selected from cohesion and firmness of a food composition.

17. The method of claim 15 wherein the cellulose ether is a hydroxypropyl methyl cellulose having the DS(methyl) of from 1.70 to 2.10 and an MS(hydroxypropyl) of from 0.15 to 0.80, the s23/s26−0.2*MS(hydroxypropyl) of the cellulose ether is 0.27 or less, having a viscosity of more than 150 mPa·s, measured as a 1.5 wt.-% solution in water at 20° C. at a shear rate of 2.55 s$^{-1}$.

* * * * *